US009638299B2

(12) United States Patent
Nass et al.

(10) Patent No.: US 9,638,299 B2
(45) Date of Patent: May 2, 2017

(54) ACTUATING DEVICE

(71) Applicant: Kiekert Aktiengesellschaft, Heiligenhaus (DE)

(72) Inventors: Ulrich Nass, Muelheim/Ruhr (DE); Christian Barmscheidt, Duisburg (DE); Carsten Fuchs, Benrath (DE); Ludger Graute, Essen (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 107 days.

(21) Appl. No.: 14/219,621

(22) Filed: Mar. 19, 2014

(65) Prior Publication Data

US 2014/0203570 A1    Jul. 24, 2014

Related U.S. Application Data

(63) Continuation of application No. 14/119,590, filed as application No. PCT/DE2012/000561 on May 26, 2012.

(30) Foreign Application Priority Data

May 28, 2011    (DE) .................... 20 2011 101 230 U

(51) Int. Cl.
*E05C 3/06* (2006.01)
*F16H 21/44* (2006.01)
(Continued)

(52) U.S. Cl.
CPC ........... *F16H 21/44* (2013.01); *E05B 53/005* (2013.01); *E05B 79/20* (2013.01); *E05B 81/20* (2013.01);
(Continued)

(58) Field of Classification Search
CPC .......... E05B 79/20; E05B 81/14; E05B 81/25; E05B 53/005; Y10T 292/0931
(Continued)

(56) References Cited

U.S. PATENT DOCUMENTS 4,374,597 A * 2/1983 Mochida ................... F16C 1/10
   292/336.3
5,531,489 A * 7/1996 Cetnar ..................... E05B 85/12
   292/225
(Continued)

FOREIGN PATENT DOCUMENTS

DE           43 27 782 A1    3/1994
DE    10 2004 052 599 A1    5/2006
(Continued)

OTHER PUBLICATIONS

International Search Report for corresponding patent application No. PCT/DE2012/000561 dated Nov. 7, 2012.

*Primary Examiner* — Mark Williams
(74) *Attorney, Agent, or Firm* — Renner, Otto, Boisselle & Sklar, LLP

(57) ABSTRACT

The invention relates to an actuating device for joint action upon at least two different elements of a motor vehicle door lock, with at least one sheathed cable having a core and sheath, wherein the sheathed cable is provided in the longitudinal extent thereof with at least two force transmission units which are designed for interaction with a first element at one end and with a second element at the other end upon action on the sheathed cable, and one of the two elements is designed as an actuating lever, wherein the other element is a closing/opening element operating on a locking mechanism.

14 Claims, 2 Drawing Sheets

Figure 1:
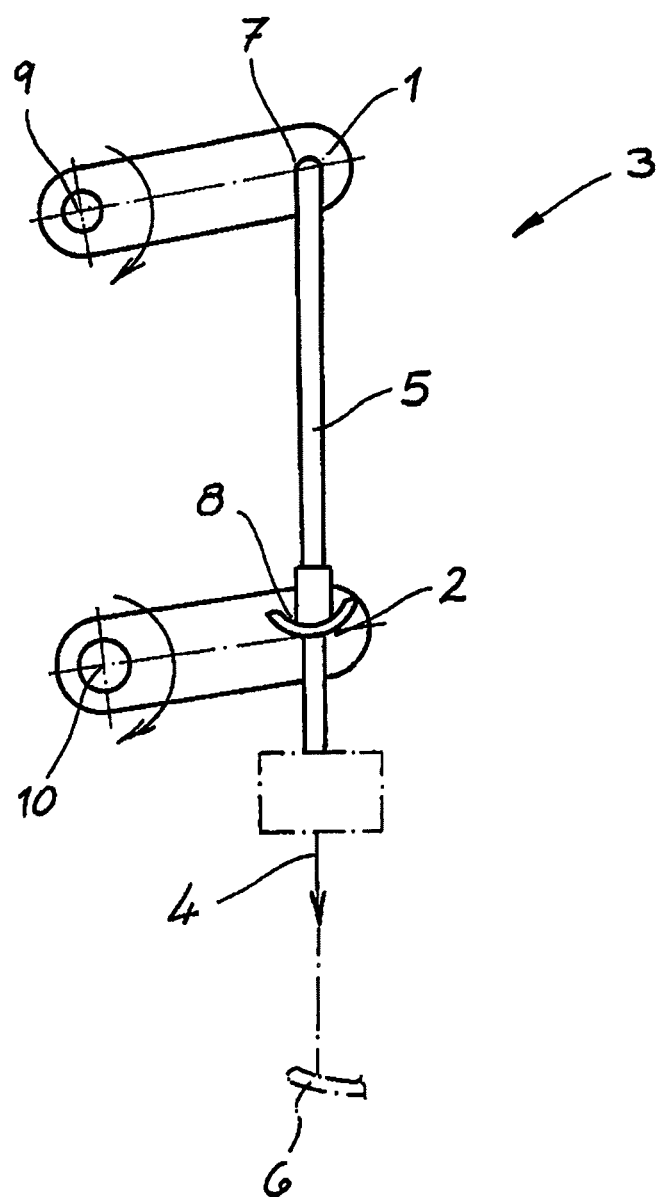

(51) Int. Cl.
  *E05B 79/20* (2014.01)
  *E05B 81/20* (2014.01)
  *E05B 81/24* (2014.01)
  *E05B 53/00* (2006.01)
  *E05B 85/00* (2014.01)
(52) U.S. Cl.
  CPC .............. *E05B 81/25* (2013.01); *E05B 85/00* (2013.01); *Y10T 74/1892* (2015.01); *Y10T 292/1076* (2015.04)
(58) Field of Classification Search
  USPC .......................... 292/196, 201, 216, DIG. 23
  See application file for complete search history.

(56) References Cited

U.S. PATENT DOCUMENTS

| | | | |
|---|---|---|---|
| 5,681,068 A * | 10/1997 | Kleefeldt | E05B 13/005 |
| | | | 292/336.3 |
| 5,918,917 A | 7/1999 | Elton et al. | |
| 6,062,615 A * | 5/2000 | Hunt | E05B 85/12 |
| | | | 292/216 |
| 6,123,372 A | 9/2000 | Rogers, Jr. et al. | |
| 6,695,360 B1 | 2/2004 | Forsell et al. | |
| 2007/0262591 A1* | 11/2007 | Wright | E05B 77/04 |
| | | | 292/216 |
| 2011/0074168 A1 | 3/2011 | Bendel et al. | |

FOREIGN PATENT DOCUMENTS

| | | |
|---|---|---|
| DE | 10 2007 012 684 A1 | 11/2007 |
| DE | 20 2008 007310 U1 | 7/2009 |
| EP | 0 304 357 A1 | 2/1989 |
| EP | 0 745 746 A1 | 12/1996 |
| EP | 0 879 926 A1 | 11/1998 |
| WO | 99/61735 A1 | 12/1999 |

* cited by examiner

ACTUATING DEVICE

This application is a continuation of U.S. patent application Ser. No. 14/119,590 filed Nov. 22, 2013, which is a National Phase application of International Application No. PCT/DE2012/000561 filed May 26, 2012, which claims priority to DE 20 2011 101 230.5 filed May 28, 2011, which are all hereby incorporated herein by reference.

DESCRIPTION

The invention relates to an actuating device for joint action upon at least two different elements of a motor vehicle door lock, with at least one sheathed cable having a core and a sheath, wherein the sheathed cable is provided in the longitudinal extent with at least two force transmission units which are designed for interaction with a first element at one end and with a second element at the other end upon action on the sheathed cable and in which one of the two elements is designed as an actuating lever.

Actuating devices for a motor vehicle door lock usually contain a handle such as an internal and/or an external door handle with the aid of which individual elements inside the motor vehicle door lock can be acted upon, such as an internal actuating lever and/or an external actuating lever in case of the example. The internal actuating lever and/or an external actuating lever are generally mechanically connected for operation with a release lever. With the aid of the release lever, a pawl is regularly released from its engagement with a rotary latch so the rotary latch can open with the aid of a spring and releases a previously retained locking bolt. As a result, the motor vehicle door containing the respective motor vehicle door lock can be opened.

The generic prior art according to DE 10 2007 012 684 A1 discloses an actuating device of the aforementioned design, in which the generation of a tensile force at the core of the sheathed cable results in the actuating of a lock assembly. In this context and in accordance with the embodiment disclosed in FIG. 5 also two different levers can be acted upon simultaneously with the aid of the core. For this purpose, spaced apart cable fittings are connected to the core. Basically the arrangement serves to retain a sliding door of a motor vehicle in a certain (opened) position.

The further prior art disclosed in DE 43 27 782 A1 refers to a door closure device with a single-movement door opening mechanism. For this purpose, the core of a sheathed cable engages with a flange and also contains a load bearing part. This procedure results in an internal locking button being moved into an unlocked position. This means that when an internal opening handle or an internal door handle is acted upon, the respective door opening actuating is executed and carried out even if the motor vehicle door lock is still in a locked state, as the core of the sheathed cable operates in such a way that the unlocked state is assumed and the door is opened at the same time.

The known measures have generally proven to be successful, are however in parts based on a complex design. Also, additional requirements are today made on motor vehicle door locks, which have not been adequately considered so far. Current motor vehicle door locks do, for instance, often contain additional closing and opening means, which at present are (still) only used in luxury cars but could, in future, be used by the mass market.

A closing means usually provides motorised closing of a tailgate or door with the aid of a conventional electric motor. As a result, the locking mechanism of the motor vehicle door lock, i.e. generally the combination of a pawl and rotary latch, is moved into its end position or fully closed position upon reaching a certain functional position, in most cases the intermediate closed position. This results in a particularly comfortable operation as a user only has to move the respective door or tailgate into the intermediate closed position after which the closing means carries out the complete closing operation. An example of such a closing means is disclosed in utility model DE 20 2008 007310 U1 of the applicant, in which the drive for the closing means is designed as a linear drive and acts on a lever, pivotably connected to a closing pawl. The closing pawl engages into a contour on the rotary latch and causes the desired closing movement.

Generally, also opening aids are known that ensure that an associated locking mechanism of the motor vehicle door lock can be opened with the aid of a motor. An example for such an opening device or opening aid is disclosed in DE 10 2004 052 599 A1. Again the primary objective of this device is to increase the level of comfort The known closing means or opening devices can result in problems when, for instance, a jacket, coat or similar piece of clothing or even a body part of the user is jammed in the gap between the closing door and the motor vehicle body. This generally causes the closing means to be deactivated. In such a situation a user does, however, intuitively operate the external door handle, expecting that the closing means is immediately deactivated and that, at the same time, the motor vehicle door is opened to release the jammed part. At present, no convincing solutions are available that produce and allow this desired operation in a simple design manner.

The invention is based on the technical problem of further developing said actuating device in such a way that operating and safety-related problems caused by the closing and opening means are avoided with little effort.

To solve this technical problem, a generic actuating device for joint action upon at least two different elements of a motor vehicle door lock as disclosed in the invention is characterised in that the other of the two elements is a closing/opening element acting on the locking mechanism. In other words, the two different elements of the motor vehicle door lock are, on one hand, designed as an actuating lever and, on the other hand, as a closing/opening element or element interacting therewith, which acts on the locking mechanism.

Normally, the first element is designed as an actuating lever, whilst the second element is a closing element. Both elements interact with the sheathed cable, containing two force transmission units for this purpose. So as soon as a force acts upon the sheathed cable, the actuating lever and the closing element are acted upon via assigned force transmission units.

The actuating lever is an internal actuating lever, an external actuating lever, a main actuating lever, etc. The internal actuating lever is regularly acted upon by the internal door handle. The external actuating lever is, on the other hand mechanically connected to an external door handle for operation. The main actuating lever can be interposed between the internal actuating lever and the external actuating lever or can be acted upon by a motorised drive.

So as soon as the internal door handle is, in the example, activated by a user, the sheathed cable coupling the internal door lever to the internal actuating lever, is also acted upon. The sheathed cable is then deflected by the force. As a result, the internal actuating lever and the closing element or the closing/opening element are acted upon.

Where the closing element in the example is thus engaging in the locking mechanism and the internal door handle is acted upon by the user, the applied force ensures that the internal actuating lever and the closing element are actuated. As a result, the locking mechanism is normally opened and a closing means is rendered ineffective by the closing element.

To achieve this, the internal actuating lever acted upon by the internal door handle acts on the release lever, which in turn lifts the pawl off the rotary latch. This is achieved as a result of a mechanical coupling of the first force transmission unit of the sheathed cable with the internal actuating lever. As the sheathed cable interacts with the closing element via a further second force transmission unit with a time overlap, the closing element is released from its engagement with the locking mechanism. To achieve this, the closing element is, in most cases, pivoted away from a rotary latch with which it previously engaged.—In most cases the described measures can, however, be observed at the external actuating lever chain, i.e. in the interaction between the external door handle and the respective external actuating lever. In this case, the external actuating lever acts upon the release lever, whilst the sheathed cable pivots the closing element away from the rotary latch.

This is particularly successful if the closing element is designed as a closing pawl abutting the rotary latch of the locking mechanism. In most cases, a lever and, in particular, a closing lever is assigned to the closing pawl, acted upon by a closing drive. As soon as the rotary latch has reached a certain specified position, in most cases the intermediate closed position, the closing pawl engages with a respective closing contour on the rotary latch. At the same time, the closing operation is started, acting upon the lever or closing lever in such a way that the closing pawl connected to the lever moves the rotary latch from the intermediate closed position into the end position or fully closed position. Where during this process, a piece of clothing becomes, for instance jammed in a gap between the motor vehicle body and the closing motor vehicle door, a manual activation of the external door handle by the user directly ensures that the closing pawl (of the second element) is, so to speak, ejected and the motor vehicle door lock is opened.

Both operations do not necessarily have to happen at the same time and synchronously but, instead, a time overlap suffices and the fact that, in particular, the closing pawl has left the rotary latch as soon as it moves into its opening position (aided by the spring) once the pawl has been disengaged.

To provide the two force transmission units, the sheathed cable is generally suspended in the first element, defining the first force transmission unit. The first element is generally the external actuating lever to which the first force transmission unit is assigned. The second, spaced apart element is in most cases a closing pawl. At this point, the sheathed cable contains a driving drum as a second force transmission unit.

Upon activation of the sheathed cable, the driving drum generally interacts with a stop on an ejection lever, acting in turn on the closing pawl. The stop is generally an arched stop with a receiving slot. Most of the sheathed cable passes through said receiving slot beyond the driving drum, which interacts—as described—with the stop on the ejection lever.

So as soon as the driving drum rests against the stop and pivots the ejection lever in this way, the ejection lever is able to disengage the closing element or the closing pawl from the locking mechanism. For this purpose, the ejection lever moves against an actuating journal of the closing element when acted upon. As a result, the (possible) engagement of the closing element in the locking mechanism is released.

In addition to its operative connection with the core of the sheathed cable, the ejection lever can also be mechanically connected to the internal actuating lever. The design is generally chosen in such a way that upon its activation, the internal actuating lever acts on the ejection lever for the closing element via an internal actuating ejection lever. This means that when a force is exerted on the internal actuating lever with the aid of the internal door handle, the internal actuating ejection lever is also being acted upon. The internal actuating ejection lever now acts on the ejection lever for the closing element in a similar manner in which the sheathed cable is acted upon. This means that this operation also corresponds with the ejection lever for the closing element mechanically separating the closing element from the locking mechanism via the internal actuating ejection lever.

From a topological point of view it has proven to be successful for the second element or the ejection lever and the (external) actuating lever to be arranged on a parallel plane in comparison to a locking mechanism plane. In contrast, the internal actuating lever and also the internal actuating ejection lever are arranged in a plane perpendicular to the locking mechanism plane. The internal actuating ejection lever must therefore be provided in order to convert the movement of the internal actuating lever in the plane perpendicular to the locking mechanism plane into a rotary movement in or parallel to this locking mechanism plane, with the aid of which the ejection lever assigned to the closing element is acted upon with the desired force.

As a result, an actuating device for a motor vehicle door lock is provided which is typically suited and designed for joint action upon the external actuating lever at one end as well as the closing pawl of a closing means at the other end. As soon as the sheathed cable of the actuating device is thus acted upon with a certain (pulling) force, the external actuating lever is deflected and the closing pawl is lifted off the locking mechanism. This generally occurs with a time overlap, in any case in such a way that the closing pawl is lifted mechanically off the locking mechanism as soon as the rotary latch starts its opening movement (with the aid of a spring).

This considerably increases the level of comfort in a simple manner. Any incorrect functioning or safety problems, for instance during the closing operation, can be directly and quickly terminated by a user as part of an intuitive process by the user operating the external door handle. This directly interrupts the closing operation as the closing element is disengaged from the locking mechanism by means of the ejection lever. At the same time, the motor vehicle door, acted upon in this manner, is opened as desired. All of this occurs quickly and with little design and installation effort, as the sheathed cable for connecting the external door handle and the external actuating lever and the closing pawl or the ejection lever assigned to the closing pawl only contains two attachment points. These attachment points or force transmission units can be easily provided. The second force transmission unit or driving drum implemented at this point can already be factory fitted to the sheathed cable so that the sheathed cable only has to be inserted in the external actuating lever during assembly in order to provide the first force transmission unit. These are the main advantages of the invention.

Figure 2:
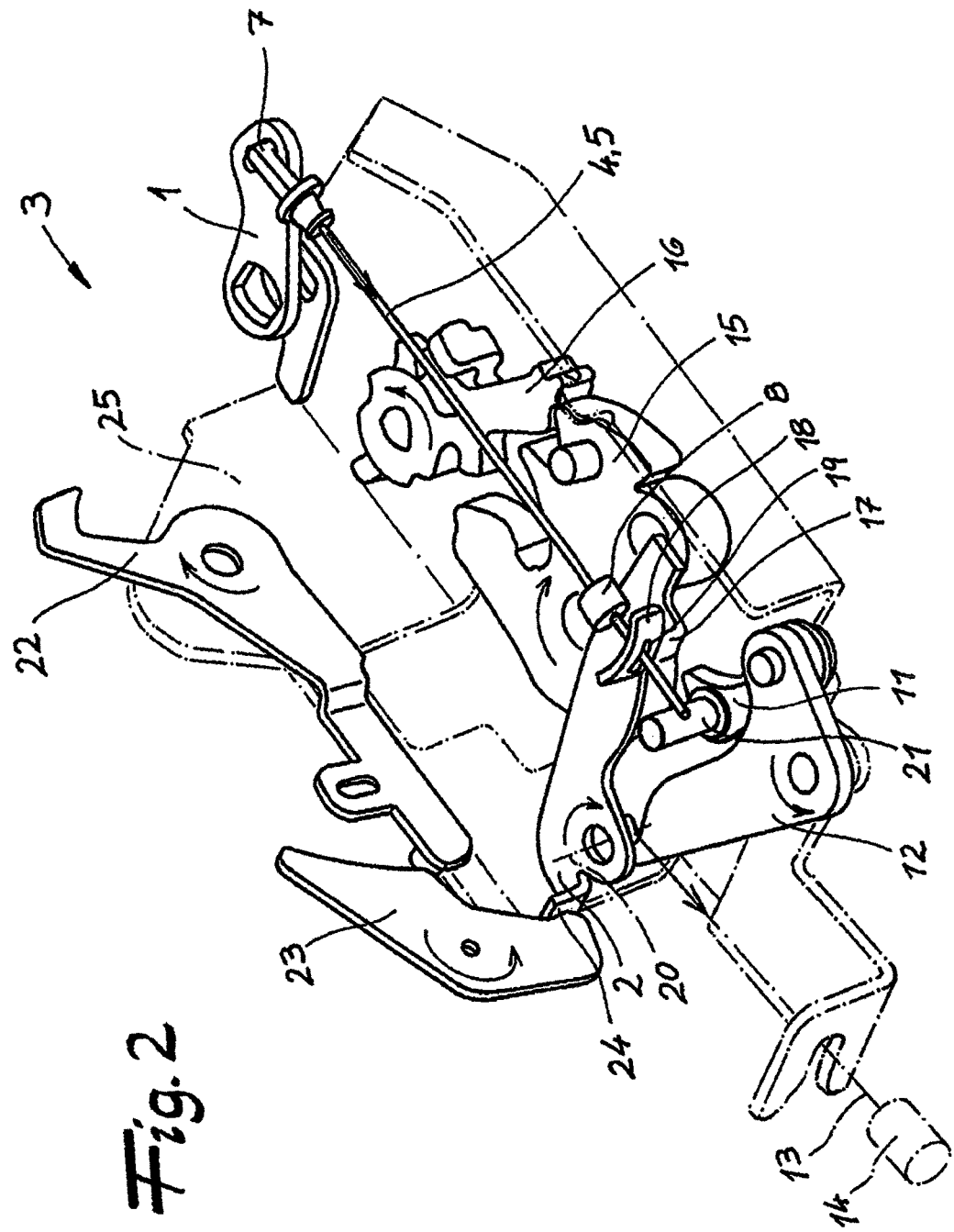

Below the invention is explained in detail with reference to a drawing showing only one example, in which:

FIG. 1 represents a schematic overview of the actuating device of the invention and FIG. 2 shows a motor vehicle door lock with the actual design of the actuating means of the invention.

FIGS. 1 and 2 show an actuating device for joint action upon at least two different elements 1, 2 of a motor vehicle door lock 3. For this purpose the actuating device contains a sheathed cable 4, 5 as the main element. The sheathed cable 4, 5 contains a core 4 and a sheath 5.

In the embodiment, the sheathed cable 4, 5 is a Bowden cable 4, 5. Its sheath 5 is in stationary position and is supported by the motor vehicle door lock 3. In contrast, core 4 is moveable inside the sheath 5 and can, in particular, carry out a pulling movement from a handle 6 onto said elements 1, 2 of the motor vehicle door 3 as shown by the arrow in FIG. 1. In the embodiment, the handle 6 is an external door handle 6, although this is not limiting and mandatory for the invention.

The core 4 of the sheathed cable 4, 5 contains at least two force transmission units 7, 8 in the longitudinal extent thereof, which are spaced apart. Indeed, FIG. 1 shows a first force transmission unit 7 at the end of the core 4 and a spaced apart second force transmission unit 8 along the longitudinal extent of the core 4. The first force transmission unit 7 is a hook or a comparable connecting element, with the aid of which the end of core 4 is attached to an opening of the first element 1. In contrast, the second force transmission unit 8 is designed as a driving drum 8 attached in the factory or also subsequently to the core 4.

The force transmission units 7, 8 spaced apart and arranged in the longitudinal extent of the core 4 are designed to, on one hand, interact with the first element 1 and, on the other hand, with the second element 2 when the core 4 is acted upon with the aid of the handle 6. The application of a force onto the core 4 actually causes the first element 1 or the external actuating lever 1 of the motor vehicle door lock 3, provided at this point, to be pivoted around its axis 9 in clockwise direction as indicated by an arrow in FIG. 1. When a force is applied to the core 4, the second element 2 is also pivoted in clockwise direction around its associated axis 10. In the example, the second element 2 is an ejection lever 2, assigned to a closing element 11. The closing element 11 is mechanically connected to a closing lever 12. The closing element 11 is indeed a closing pawl 11 pivotably mounted on the closing lever 12. The closing lever 12 is acted upon by a closing drive 14 via a sheathed cable 13, only indicated in FIG. 2. Together, the closing drive 14, the sheathed cable 13, the closing lever 12 and finally the closing element or the closing pawl 11 form a closing means 11, 12, 13, 14.

As already explained, the first element 1 in the embodiment is designed as an external actuating lever 1. In principle, the first element 1 can also be an internal actuating lever or generally an actuating lever of the motor vehicle door lock 3.

The closing element 11 acts on a locking mechanism 15, 16, consisting of a rotary latch 15 and a pawl 16 interacting in the usual manner with the rotary latch 15. The closing element or the closing pawl 11 engages in a contour or closing contour 17 on the rotary latch 15 in order to close the locking mechanism 15, 16. In this way, also a locking bolt previously retained by the locking mechanism 15, 16 and connected to the motor vehicle door is retracted. The corresponding motor vehicle door then moves towards the motor vehicle body.

This operation is carried out with the aid of the closing means 11, 12, 13, 14. In the example, the closing means 11, 12, 13, 14 or the closing drive 14 is started when the rotary latch 15 is in its intermediate locked position. The closing element or the closing pawl 11 can then engage in the contour 17 on the rotary latch 15. At the same time the closing operation 14 is started and acts on the sheathed cable 13 in the direction of the arrow shown in FIG. 2. As a result, the closing lever 12 is moved in counterclockwise direction around its axis as is also indicated in FIG. 2, ensuring that the closing pawl 11 engaged in the contour 17 on the rotary latch 15, moves the rotary latch 15 in the indicated clockwise direction and from the intermediate closed position into the fully closed position.

If during the described closing operation a piece of clothing becomes, for instance, jammed between the motor vehicle door and the car body, a user can mechanically interrupt the closing operation by operating the handle or the external door handle 6 and open the motor vehicle door at the same time. In fact, the operation of the external door handle 6 causes the core 4 of the sheathed cable 4, 5f to be acted upon as indicated in FIG. 1 and also in FIG. 2. As a result, the external actuating lever 1 pivots in clockwise direction (see FIG. 1) acting upon a not expressly shown release lever, which in turn disengages the pawl 16 from the rotary latch 15. A movement of the pawl 16 in counterclockwise direction around its axis and as indicated by an arrow in FIG. 2 corresponds to this.

Prior to this or at the same time, the driving drum 8 moves against a stop 18 on the second element 2 or against the ejector lever 2 assigned to the closing pawl 11. The stop 18 is designed as an arched stop and also contains a receiving slot 19. The core 4 of the sheathed cable 4, 5 passes through the receiving slot 19. In fact, the core 4 passes through the receiving slot 19 on the other side of the driving drum 18.

As soon as the core 4 is acted upon in the direction of the shown arrow with the aid of the external door handle 6, the driving drum 8, moving against the stop 18 ensures at the core 4 that the ejection lever 2 is pivoted around its axis 20—as indicated by an arrow—in clockwise direction. This clockwise movement of the ejection lever 2 causes the closing pawl 11 to disengage from the contour 17 at the rotary latch 15. For this purpose, the closing pawl 11 contains an actuating journal 21, against which the ejection lever 2 moves with the aid of the driving drum 8, when acted upon.

As a result, the closing drive 11, 12, 13, 14 and the closing element or the closing pawl 11 is mechanically separated from the locking mechanism 15, 16. The locking mechanism 15, 16 is therefore no longer acted upon in the closing sense. As a result, the rotary latch 15 can open with the aid of a spring after disengagement of the pawl 16, by carrying out a counter-clockwise movement—against the direction of the closing movement. A locking bolt previously retained by the rotary latch 15 and not expressly shown, is released. The same applies for a motor vehicle door, to which the locking bolt is connected.

The ejection lever 2 assigned to the closing pawl 11, is not only mechanically connected to the external door handle 6 via the core 4 and the sheathed cable 4, 5. Instead, the ejection lever 2 can also interact functionally as well as mechanically with an internal actuating lever 22. The internal actuating lever 22 in turn is mechanically connected to an internal door handle—not shown in the drawings. An operation of the internal door handle causes the internal actuating lever 22—as indicated—to pivot clockwise around its axis. This clockwise movement of the internal actuating lever 22 upon operation of the internal door handle—not shown—is transmitted by an internal actuating ejection lever 23 onto the ejection lever 2 assigned to the closing pawl 11.

In fact the clockwise movement of the internal actuating lever 22 corresponds to the internal actuating ejection lever 23 pivoting in counterclockwise direction as a result. This causes the internal actuating ejection lever 23 to engage with a stop edge 24 on the ejection lever 2. This means that through the internal actuating ejection lever 23 the internal actuating lever 22 acts on ejection lever 2 assigned to the closing pawl 11 when operated. For this purpose, the internal actuating ejection lever 23 moves against stop 24 during its counterclockwise movement and ensures that the ejection lever 2—as when it is acted upon by the external door handle 6—is pivoted in clockwise direction, disengaging the closing pawl 11 from the rotary latch 15.

It is apparent that the ejection lever 2 and the external actuating lever 1 are arranged on a parallel plane compared to a locking mechanism plain defined by the locking mechanism 15, 16. In contrast, the internal actuating lever 22 and the internal actuating ejection lever 23 are arranged on a plane perpendicular to the locking mechanism plane. For this purpose, the locking mechanism 15, 16 is arranged in an L-shaped leg of an L-shaped lock case 25, whilst the internal actuating lever 22 and also the internal actuating ejection lever 23 are arranged on another L-shaped leg. The ejection lever 2 and also the external actuating lever 1 are, on the other hand, arranged in a not expressly shown lock cover connected with the lock case 25.

In another embodiment—not shown—the driving drum 8 can also be arranged on the sheath 5 of the sheathed cable (4, 5).

The invention claimed is:

1. Actuating device for joint action upon at least two different elements comprising a first element being an actuating lever and a second element being a closing/opening element of a motor vehicle door lock with at least one sheathed cable having a core and sheath, wherein the sheathed cable is provided in the longitudinal extent thereof with a first force transmission unit and a second force transmission unit which are coupled to each other by the sheathed cable;
   wherein the first force transmission unit includes the first element at one end of the sheathed cable, and a second end of the sheathed cable opposite from the first end is connected to a handle for operating the sheathed cable,
   wherein the second force transmission unit includes the second element and is located along a longitudinal extent of the cable spaced apart from the first force transmission unit, and
   wherein upon action on the sheathed cable the first force transmission unit and the second force transmission unit respectively act simultaneously on the first element and the second element, thereby operating on a locking mechanism to move the door lock from a closed position to an open position.

2. Device according to claim 1, wherein the actuating lever is one of an external actuating lever, internal actuating lever, or main actuating lever.

3. Device according to claim 1, wherein the closing/opening element is designed as a closing element and as part of a closing means.

4. Device according to claim 1, wherein the closing/opening element is designed as a closing pawl engaging with the rotary latch of the locking mechanism.

5. Device according to claim 4, wherein a closing lever is assigned to the closing pawl and acted upon by the closing pawl.

6. Device according to claim 1, wherein the first element is designed as an external actuating lever and the second element is designed as an ejection lever acting on the closing/opening element, and the first element and the second element are spaced apart.

7. Device according to claim 1, wherein the core of the sheathed cable is engaged in the first force transmission unit to provide a connection with the second force transmission unit.

8. Device according to claim 7, wherein the second force transmission unit includes a driving drum that interacts with a stop on the second element upon actuation of the sheathed cable.

9. Device according to claim 8, wherein the stop is an arched stop with a receiving slot accommodating the sheathed cable on the other side of the driving drum.

10. Device according to claim 1, wherein the second element moves against an actuating journal of the closing/opening element when acted upon and disengages it from the locking mechanism.

11. Device according to claim 1, wherein the second element is functionally as well as mechanically connected to an internal actuating lever.

12. Device according to claim 11, wherein the internal actuating lever acts on the ejection lever via an internal actuating ejection lever upon its activation.

13. Device according to claim 1, wherein the second element and the actuating lever are arranged on a parallel plane in relation to the locking mechanism plane.

14. Device according to claim 11, wherein the internal actuating lever together with the internal actuating ejection lever are arranged in a plane perpendicular to the plane of the locking mechanism.

* * * * *